No. 612,618. Patented Oct. 18, 1898.
G. SINTZ.
PROPELLER.
(Application filed Jan. 27, 1897.)
(No Model.) 3 Sheets—Sheet 1.
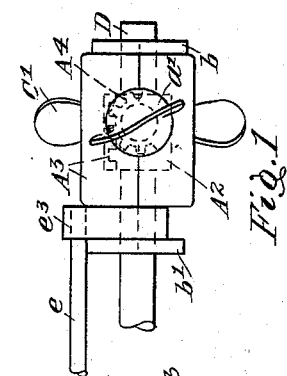
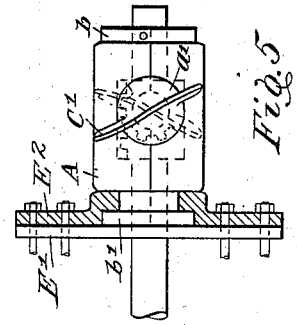
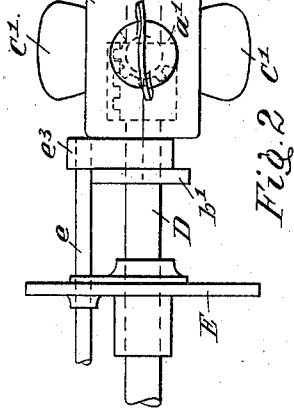
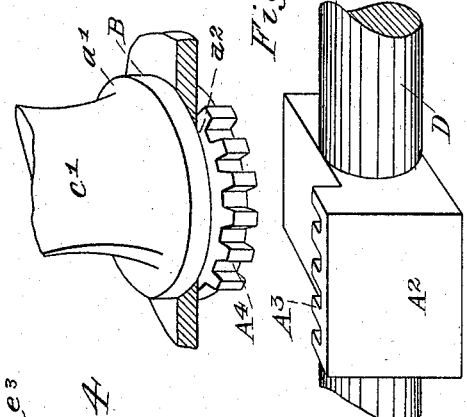
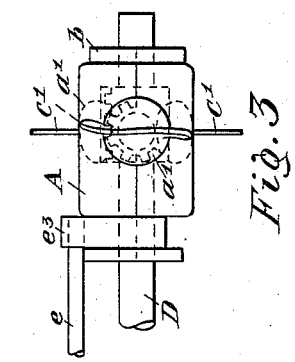
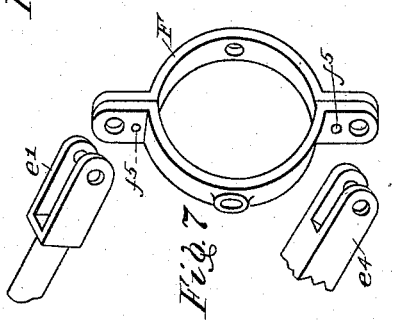
Witnesses
Samuel H. Richardson.
William P. Smith.
Inventor
George Sintz
by Frank E. Adams
Attorney No. 612,618. Patented Oct. 18, 1898.
G. SINTZ.
PROPELLER.
(Application filed Jan. 27, 1897.)
(No Model.) 3 Sheets—Sheet 2.
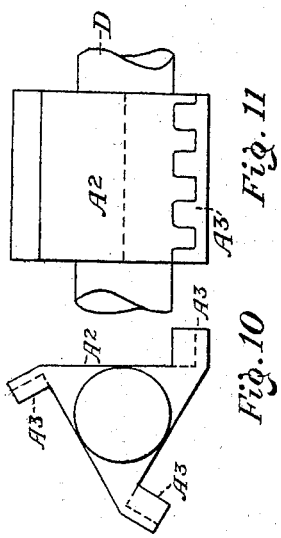
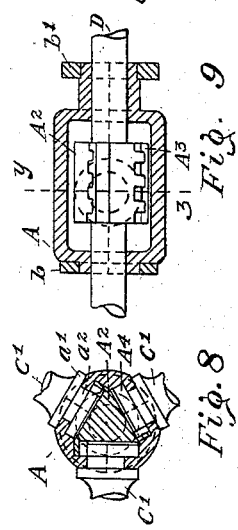
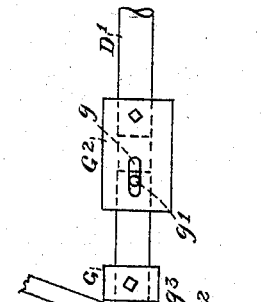
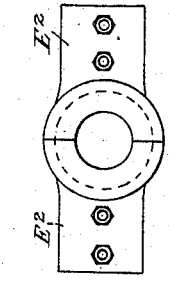
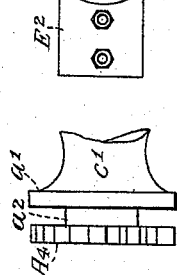
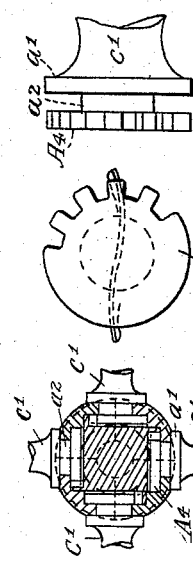
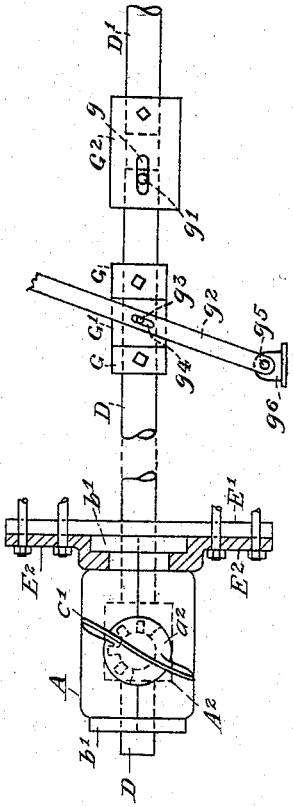
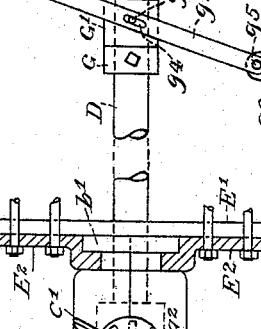
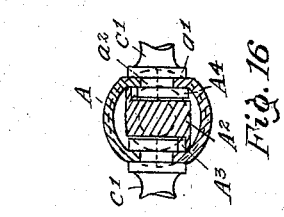
Witnesses
Clarence L. White
Elston H. Camp
Inventor
George Sintz
by Frank E. Adams
Attorney No. 612,618. Patented Oct. 18, 1898.
G. SINTZ.
PROPELLER.
(Application filed Jan. 27, 1897.)
(No Model.) 3 Sheets—Sheet 3.
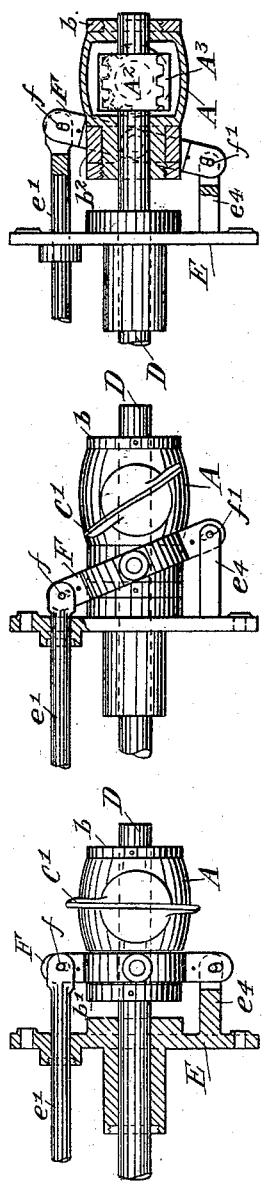
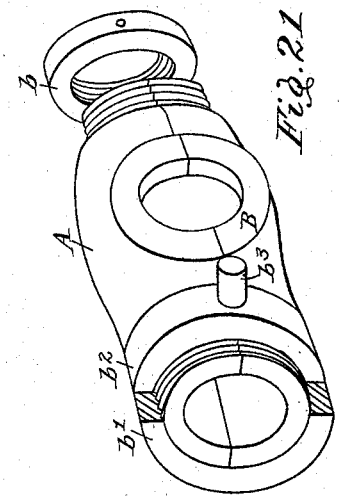
Witnesses
Samuel H. Richardson
William P. Smith
Inventor
George Sintz
by Frank E. Adams
Attorney

UNITED STATES PATENT OFFICE.

GEORGE SINTZ, OF SEATTLE, WASHINGTON.

PROPELLER.

SPECIFICATION forming part of Letters Patent No. 612,618, dated October 18, 1898.

Application filed January 27, 1897. Serial No. 620,906. (No model.)

*To all whom it may concern:*

Be it known that I, GEORGE SINTZ, a citizen of the United States, residing at Seattle, in the county of King and State of Washington, have invented a new and useful Propeller, of which the following is a specification.

My invention relates to improvements in propellers which are adapted to propel boats and in which the blades or flukes thereof may be rotated to form screw-propellers of various pitch; and the objects of my improvement are, first, to provide a durable propeller of simple construction in which the pitch of the blades or flukes may be changed to provide for a forward or backward movement or to cease propulsion of the boat without stopping or changing the direction of rotation of the propeller-shaft, and when the boat is afforded other means of propulsion the blades may be set to produce the least amount of friction in passing through the water; second, in providing for the attachment of the blades or flukes to avoid protuberances on the hub, thereby reducing the friction of the propeller-hub in passing through the water, and, third, to provide a simple and durable connection of the shanks of the propeller blades or flukes with the hub.

My invention has for further objects other improvements; and it consists in novel features of construction and combination of parts, as will be hereinafter set forth, and pointed out in the appended claims.

Referring to the accompanying drawings, forming a part of this specification, Figure 1 is a side view of my propeller, showing the relative position of the different parts thereof when the blades are set to provide a forward or backward motion of the boat, according to the direction of rotation of the propeller-shaft; Fig. 2, a similar view of my propeller, but with the stern-bearing shown and the propeller-blades shifted to a position desirable when the boat is adapted for propulsion by other means than the propeller shown; Fig. 3, a similar view to Fig. 1, but showing the position of the parts and blades when desirable to rotate the propeller-shaft without propelling the boat; Fig. 4, a detailed view of a yoke adapted to engage a groove in the propeller-hub and employed when shifting the hub longitudinally upon the shaft in changing the positions of the propeller-blades and in retaining same in any desired position; Fig. 5, a side view of my propeller, showing the hub thereof connected with a stern-bearing, as necessary when the different positions of the blades are to be obtained by a longitudinal movement of the propeller-shaft; Fig. 6, a perspective view, on large scale, showing the toothed connection between the propeller shaft and blades; Fig. 7, a perspective view of the shifting-ring, fulcrum, and rod comprising a portion of the mechanism employed in one method of shifting the propeller-hub longitudinally upon the shaft in changing the pitch of the propeller-blades; Fig. 8, a cross-section on line $y\ z$ of Fig. 9, indicating the arrangements of parts in the construction of my propeller with three blades; Fig. 9, a longitudinal section of the propeller-hub, disclosing the rack-block and propeller-shaft; Figs. 10 and 11, end and side views, respectively, on large scale, of the rack-block when formed and provided with racks for a propeller comprising three blades; Fig. 12, a cross-section similar to Fig. 8, but indicating the arrangement and form of parts in the construction of my propeller when comprising four blades; Figs. 13 and 14, end and side views, respectively, on large scale, of the blade-shank when constructed for engagement with a rack of the rack-block disclosed by Figs. 10 and 11; Fig. 15, a plan view of the split retaining-plate adapted to engage an annular groove provided in the propeller-hub and to be fastened to the stern-bearing and retain the hub when desirable to change the position of the propeller-blades by shifting the propeller-shaft longitudinally; Fig. 16, a cross-section similar to Fig. 8, but indicating the arrangement and form of parts in the construction of my propeller with two blades adapted for rotation upon their axes by means of a rack-block and toothed flange; Fig. 17, a side view of the propeller, propeller-shaft, and stern-bearing and one form of shifting mechanism adapted to move the propeller-shaft longitudinally when desirable to change the position of the propeller-blades thereby and the end of the motive shaft and coupling therewith shown; Fig. 18, a side view of my propeller with two blades and the stern-bearing shown in section, with one form of shifting mechanism in place to retain the blades in position to rotate the propeller without propulsion of the boat; Fig. 19, a similar view, but indicating the position of the hub, blades, and shifting mechanism when desirable to propel the boat forward upon the rotation of the propeller-shaft over from port to starboard; Fig. 20, a longitudinal section through the center of the hub-shell, clamping-collars, and shifting-collar, disclosing the rack-block within the hub and indicating the parts shifted to provide a backward movement of the boat when the shaft is rotating as described for Fig. 19; and Fig. 21, a perspective view of the divided propeller-hub, indicating the lines of parting, and one clamping-collar in section, retaining the shifting-collar, and the opposite clamping-collar detached.

Like characters of reference indicate corresponding parts throughout the several views of the drawings.

The hollow hub A is longitudinally divided into two or more sections, which are held in position about the propeller-shaft by clamping-collars $b$ and $b'$ and are adapted to provide journals for the propeller-blades C′, the shanks of which are provided with flanges $a'$ and $A^4$, with a journal $a^2$ therebetween adapted to receive the ring-boss B, which is diametrically parted by dividing the hub A into said longitudinal sections. This separation of the hub A into the sections above mentioned provides for the setting of the propeller-blades C′ upon bosses B and the introduction of the rack-block $A^2$ of the propeller-shaft D within the hub.

In the construction of propellers comprising but two blades the connection between the propeller-shaft D and blades C′ may be accomplished by a rack-block $A^2$, fastened about or conjointly formed with the propeller-shaft and having engagement with a flange $A^4$ of the blade C′ by the teeth provided therein adapted to mesh with a rack $A^3$, provided on said block $A^2$ at opposite sides thereof, and in the construction of propellers comprising three blades the rack-block $A^2$ is formed to contain the requisite number of racks $A^3$ to provide for the engagement thereof with the teeth in the flange $A^4$ of each propeller-blade C′, and the hub A is formed of the same number of longitudinal sections to provide for the setting of each blade C′, the journal $a^2$ of which is thereby inclosed by the ring-boss B, and the flanges $a'$ and $A^4$ thereof fit snugly upon each face of the boss, forming a strong and durable support for each blade C′, as clearly indicated in the several views of the drawings. After setting the blades C′ in position and inclosing the rack-block $A^2$ within the shell of the divided hub A the longitudinal sections comprising the hub are secured together by the clamping-collars $b$ and $b'$, fitting about the hub at each end by means of a threaded connection therewith, or the collars $b$ and $b'$ may be set about the hub by driving same over the ends, thus clamping the sections together upon their parting surfaces loosely about the shaft D, permitting of a longitudinal shifting of the hub or shaft when desirable.

To provide for the rotation of the propeller-blades C′ upon their axes, when desirable to change the pitch thereof, a longitudinal movement of the hub A upon the shaft D or a similar movement of the shaft within the hub is necessary, that the toothed connections between the propeller blades and shaft heretofore explained may perform their functions. When desirable to obtain this rotation of the propeller-blades C′ by a longitudinal shifting of the hub A upon the shaft D, the yoke $e^3$ (indicated in Figs. 1, 2, 3, and 4) may be employed. This yoke is adapted to fit loosely in a groove provided between the clamping-collar $b'$ and a shoulder formed by the shell of the hub A and is adapted to slip the hub upon the shaft, while permitting of the rotation of same. This movement is obtained by operating the shifting-rod $c$, which is provided with any ordinary means for obtaining a longitudinal movement and for locking the device and securing the position of the hub A at any desired point. This longitudinal shifting of the hub may also be accomplished by the device disclosed by Figs. 7, 18, 19, 20, and 21 and comprising a divided shifting-ring F, the halves thereof fastened together and fulcrumed in a bracket $e^4$ by a pivot $f'$ and having a pivotal connection with a loose pin-collar $b^2$, which is retained between a shoulder on the hub A and the clamping-collar $b'$, and with a shifting-rod $e'$, which is adapted to throw the shifting-ring, thereby shifting the hub longitudinally upon the shaft, and is provided with any ordinary means for retaining the hub in any desired position, thus securing the pitch of the propeller-blades C′, as required. When desirable to provide for the different positions of the propeller-blades C′ by shifting the propeller-shaft D longitudinally within the hub A, the hub is secured from longitudinal movement by a split retaining-plate $E^2$, (shown in Figs. 5, 15, and 17,) adapted to fit loosely in the groove formed between the clamping-collar $b'$ and the shoulder formed by the shell of the hub A and fastened to the plate E′ of the stern-bearing. The shaft D may then be shifted as desired by the mechanism illustrated in Fig. 17, in which the propeller-shaft D has connection with a motive shaft D′ by a coupling, fast to the end of shaft D′ and having a longitudinal slot $g$, engaging a pin $g'$, fast in the shaft D, near the end thereof, and permitting of the longitudinal movement of the propeller-shaft D without disturbing the position of the motive shaft D′. This longitudinal movement is obtained by actuating a lever $g^2$, which is fulcrumed to a bracket $g^6$ by a pivot $g^5$ and has pivotal connection with a loose collar G′, retained between the set collars G, a pin $g^3$ of said loose collar engaging an elongated slot $g^4$ in said lever. This lever may be provided with any ordinary means for locking in different positions.

It will be noted that when the propeller shaft and hub are secured in any desired position against end motion the toothed connection between the shaft and shanks of the propeller-blades locks the blades in a relative position thereto, retaining them at the desired pitch.

Having thus described my invention, what I claim, and desire to secure by Letters Patent, is—

1. The combination of a propeller-shaft, a rack-block thereon, a hub loose upon said shaft inclosing said block, propeller-blades journaled in said hub, each having toothed connection with said block, concentric with said journal but within said hub, and means for shifting said hub endwise to rotate said blades in passing said block; substantially as shown and described.

2. The combination of a propeller-shaft, a block thereon carrying racks, a hub loose upon said shaft inclosing said block, propeller-blades journaled in said hub, each having teeth concentric with said journal and engaging one of said racks within said hub, and means for shifting said hub endwise to rotate said blades in passing said block; substantially as shown and described.

3. The combination of a propeller-shaft, a rack-block thereon, a loose hub inclosing said block and comprising longitudinal sections with half-ring bosses registering on the lines of parting, and means for clamping said sections together, propeller-blades journaled in said ring-bosses with flanges at each face, and teeth on the under of said flanges engaging said block, and means adapted to shift said hub endwise to rotate said blades in passing said block, substantially as shown and described.

4. The combination of a propeller-shaft, a block fast thereon carrying racks, a loose hub inclosing said block and comprising longitudinal sections with half-ring bosses registering on the lines of parting, and means for clamping said sections together, propeller-blades journaled in said ring-bosses with flanges at each face, and teeth in the under of said flanges engaging one of said racks, and means adapted to shift said hub endwise to rotate said blades in passing said block, substantially as shown and described.

5. In propellers comprising a hollow hub adapted to be moved endwise, and revoluble blades journaled through the case thereof, and a shaft through said hub, the combination of a rack-block fast on said shaft, with the means on said blades for engagement with said racks concentric with said journals; substantially as shown and described.

6. In propellers having revoluble blades, the hollow hub thereof comprising longitudinal sections with half-ring bosses registering on the lines of parting adapted to journal said blades, and means for clamping said sections together about the propeller-shaft, and blade-journals; substantially as shown and described.

GEORGE SINTZ.

Witnesses:
FRANK E. ADAMS,
CLARENCE L. WHITE.